US012770466B2

(12) United States Patent
Hawkins et al.

(10) Patent No.: US 12,770,466 B2
(45) **Date of Patent: *Oct. 20, 2026**

(54) SYSTEMS AND METHODS FOR COMMUNICATIONS BETWEEN ELECTRONIC GAMING MACHINES, A PROGRESSIVE SYSTEM SERVER, AND OVERHEAD SIGNAGE

(71) Applicant: Aristocrat Technologies Australia Pty Limited, North Ryde (AU)

(72) Inventors: Ryan Hawkins, Henderson, NV (US); Robert Honeycutt, Henderson, NV (US)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 297 days.

This patent is subject to a terminal disclaimer.

(21) Appl. No.: 17/820,530

(22) Filed: Aug. 17, 2022

(65) Prior Publication Data

US 2022/0392307 A1 Dec. 8, 2022

Related U.S. Application Data

(63) Continuation of application No. 17/109,976, filed on Dec. 2, 2020, now Pat. No. 11,423,740, which is a (Continued)

(51) Int. Cl.
*G07F 17/32* (2006.01)

(52) U.S. Cl.
CPC ...... *G07F 17/3258* (2013.01); *G07F 17/3223* (2013.01); *G07F 17/3227* (2013.01)

(58) Field of Classification Search
CPC ............. G07F 17/3258; G07F 17/3223; G07F 17/3227
See application file for complete search history.

(56) References Cited

U.S. PATENT DOCUMENTS

| | | | |
|---|---|---|---|
| 2001/0004607 | A1 | 6/2001 | Olsen |
| 2005/0023954 | A1 | 2/2005 | Jung |

(Continued)

OTHER PUBLICATIONS

Australian Examination Report No. 1 issued in App. No. AU2019202487, dated Jan. 31, 2024, 4 pages.

(Continued)

*Primary Examiner* — Kang Hu
(74) *Attorney, Agent, or Firm* — Armstrong Teasdale LLP

(57) ABSTRACT

An electronic gaming system includes an electronic gaming machine configured to execute a wagering game, an overhead display, and a progressive system server. The progressive system server is configured to: (i) receive, from the electronic gaming machine, a message including at least one of a) a progressive jackpot value, b) a progressive jackpot level, and c) a progressive jackpot multiplier, the progressive jackpot value, the progressive jackpot level, and the progressive jackpot multiplier awarded by the electronic gaming machine during the wagering game; (ii) calculate a multiplied progressive jackpot value by multiplying the received progressive jackpot value by the received progressive jackpot multiplier; and (iii) transmit the multiplied progressive jackpot value to the electronic gaming machine, wherein the electronic gaming machine is configured to increase a credit balance associated with the wagering game based on the multiplied progressive jackpot value.

20 Claims, 10 Drawing Sheets

Related U.S. Application Data continuation of application No. 15/948,527, filed on Apr. 9, 2018, now Pat. No. 10,977,900.

(56) References Cited

U.S. PATENT DOCUMENTS

| | | | |
|---|---|---|---|
| 2005/0239542 | A1 | 10/2005 | Olsen |
| 2007/0006032 | A1 | 1/2007 | Sun |
| 2007/0060321 | A1 | 3/2007 | Vasquez |
| 2008/0108423 | A1 | 5/2008 | Benbrahim |
| 2008/0287183 | A1 | 11/2008 | Reeves, III |
| 2014/0045587 | A1 | 2/2014 | Johnson |
| 2016/0314657 | A1 | 10/2016 | Buchholz |
| 2017/0027834 | A1 | 2/2017 | Batchelor |
| 2017/0278341 | A1 | 9/2017 | Moore |
| 2018/0007570 | A1 | 1/2018 | Byun |
| 2018/0075707 | A1 | 3/2018 | Hirai |

OTHER PUBLICATIONS

Office Action dated Jun. 22, 2020 for U.S. Appl. No. 15/948,527 (pp. 1-11).
Notice of Allowance dated Nov. 2, 2020 for U.S. Appl. No. 15/948,527 (pp. 1-5).
Notice of Allowance dated Sep. 10, 2020 for U.S. Appl. No. 15/948,497 (pp. 1-5).
Australian Examination Report No. 1 issued in App. No. AU2025200675, dated Mar. 31, 2026 (pp. 1-2).

SYSTEMS AND METHODS FOR COMMUNICATIONS BETWEEN ELECTRONIC GAMING MACHINES, A PROGRESSIVE SYSTEM SERVER, AND OVERHEAD SIGNAGE

CROSS-REFERENCE TO RELATED APPLICATIONS

This application is a continuation of and claims priority to U.S. patent application Ser. No. 17/109,976, filed Dec. 2, 2020, which is a continuation of U.S. patent application Ser. No. 15/948,527, now U.S. Pat. No. 10,977,900, filed Apr. 9, 2018, the contents and disclosures of which are incorporated by reference herein in their entireties.

TECHNICAL FIELD

The field of disclosure relates generally to electronic gaming, and more particularly to systems and methods for communications between one or more electronic gaming machines, a progressive system server and/or overhead signage.

BACKGROUND

Electronic gaming machines (EGMs), or gaming devices, provide a variety of wagering games such as, for example, and without limitation, slot games, video poker games, video blackjack games, roulette games, video bingo games, keno games, and other types of games that are frequently offered at casinos and other locations. Play on EGMs typically involves a player establishing a credit balance by inserting or otherwise submitting money and placing a monetary wager (deducted from the credit balance) on one or more outcomes of an instance, or play, of a primary game, sometimes referred to as a base game. In many games, a player may qualify for secondary games or bonus rounds by attaining a certain winning combination or other triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

Slot games are often displayed to the player in the form of various symbols arranged in a row-by-column grid, or "matrix." Specific matching combinations of symbols along predetermined paths, or paylines, drawn through the matrix indicate the outcome of the game. The display typically highlights winning combinations and outcomes for ready identification by the player. Matching combinations and their corresponding awards are usually shown in a "pay-table" that is available to the player for reference. Often, the player may vary his/her wager to included differing numbers of paylines and/or the amount bet on each line. By varying the wager, the player may sometimes alter the frequency or number of winning combinations, the frequency or number of secondary games, and/or the amount awarded.

Typical games use a random number generator (RNG) to randomly determine the outcome of each game. The game is designed to return a certain percentage of the amount wagered back to the player, referred to as return to player (RTP), over the course of many plays or instances of the game. The RTP and randomness of the RNG are fundamental to ensuring the fairness of the games and are therefore highly regulated. The RNG may be used to randomly determine the outcome of a game and symbols may then be selected that correspond to that outcome. Alternatively, the RNG may be used to randomly select the symbols whose resulting combinations determine the outcome. Notably, some games may include an element of skill on the part of the player and are therefore not entirely random.

Within a casino, EGMs are often physically grouped in "banks" and arranged to contribute to one or more progressive jackpots. For example, each EGM organized within a bank of EGMs may contribute to a plurality of progressive jackpots, commonly referred to as "linked progressive jackpots" to indicate that the jackpots receive contributions from more than a single EGM. Traditionally, an overhead sign is mounted atop the bank of EGMs and is arranged to display a value of each linked progressive jackpot. Specifically, a progressive controller communicatively coupled to the EGMs and the overhead sign may, in some cases, maintain a record of each jackpot value and advertise these values on the overhead sign to attract passers-by within the casino. However, progressive controllers are typically incapable of providing additional detail to the one or more overhead signs.

Accordingly, systems and methods for communications between one or EGMs and one or more overhead signs are desirable. More particularly, systems and methods for communications between one or more EGMs, a progressive system server, and one or more overhead signs are desirable.

BRIEF DESCRIPTION

In one aspect, an electronic gaming system is provided. The electronic gaming system includes an electronic gaming machine configured to execute a wagering game, an overhead display, and a progressive system server communicatively coupled to the electronic gaming machine and the overhead display. The progressive system server is configured to facilitate communications between the electronic gaming machine and the overhead display and is further configured to: (i) receive, from the electronic gaming machine, a message including at least one of a) a progressive jackpot value, b) a progressive jackpot level, and c) a progressive jackpot multiplier, the progressive jackpot value, the progressive jackpot level, and the progressive jackpot multiplier awarded by the electronic gaming machine during the wagering game; (ii) calculate a multiplied progressive jackpot value by multiplying the received progressive jackpot value by the received progressive jackpot multiplier; and (iii) transmit the multiplied progressive jackpot value to the electronic gaming machine, wherein the electronic gaming machine is configured to increase a credit balance associated with the wagering game based on the multiplied progressive jackpot value.

In another aspect, a progressive system server is provided. The progressive system server includes a processor for controlling a linked progressive jackpot. The processor is configured to perform operations comprising: (i) receiving, from an electronic gaming machine, a message including at least one of a) a progressive jackpot value, b) a progressive jackpot level, and c) a progressive jackpot multiplier, the progressive jackpot value, the progressive jackpot level, and the progressive jackpot multiplier awarded by the electronic gaming machine during the wagering game; (ii) calculating a multiplied progressive jackpot value by multiplying the received progressive jackpot value by the received progressive jackpot multiplier; and (iii) transmitting the multiplied progressive jackpot value to the electronic gaming machine, wherein the electronic gaming machine is configured to increase a credit balance associated with the wagering game based on the multiplied progressive jackpot value.

In yet another aspect, a method for facilitating two-way communications between a progressive system server and an electronic gaming machine communicatively coupled to the progressive system server is provided. The method includes: (i) receiving, from the electronic gaming machine, a message including at least one of a) a progressive jackpot value, b) a progressive jackpot level, and c) a progressive jackpot multiplier, the progressive jackpot value, the progressive jackpot level, and the progressive jackpot multiplier awarded by the electronic gaming machine during the wagering game; (ii) calculating a multiplied progressive jackpot value by multiplying the received progressive jackpot value by the received progressive jackpot multiplier; and (iii) transmitting the multiplied progressive jackpot value to the electronic gaming machine, wherein the electronic gaming machine is configured to increase a credit balance associated with the wagering game based on the multiplied progressive jackpot value.

BRIEF DESCRIPTION OF THE DRAWINGS

An example embodiment of the subject matter disclosed will now be described with reference to the accompanying drawings.

DETAILED DESCRIPTION

Figure 1:
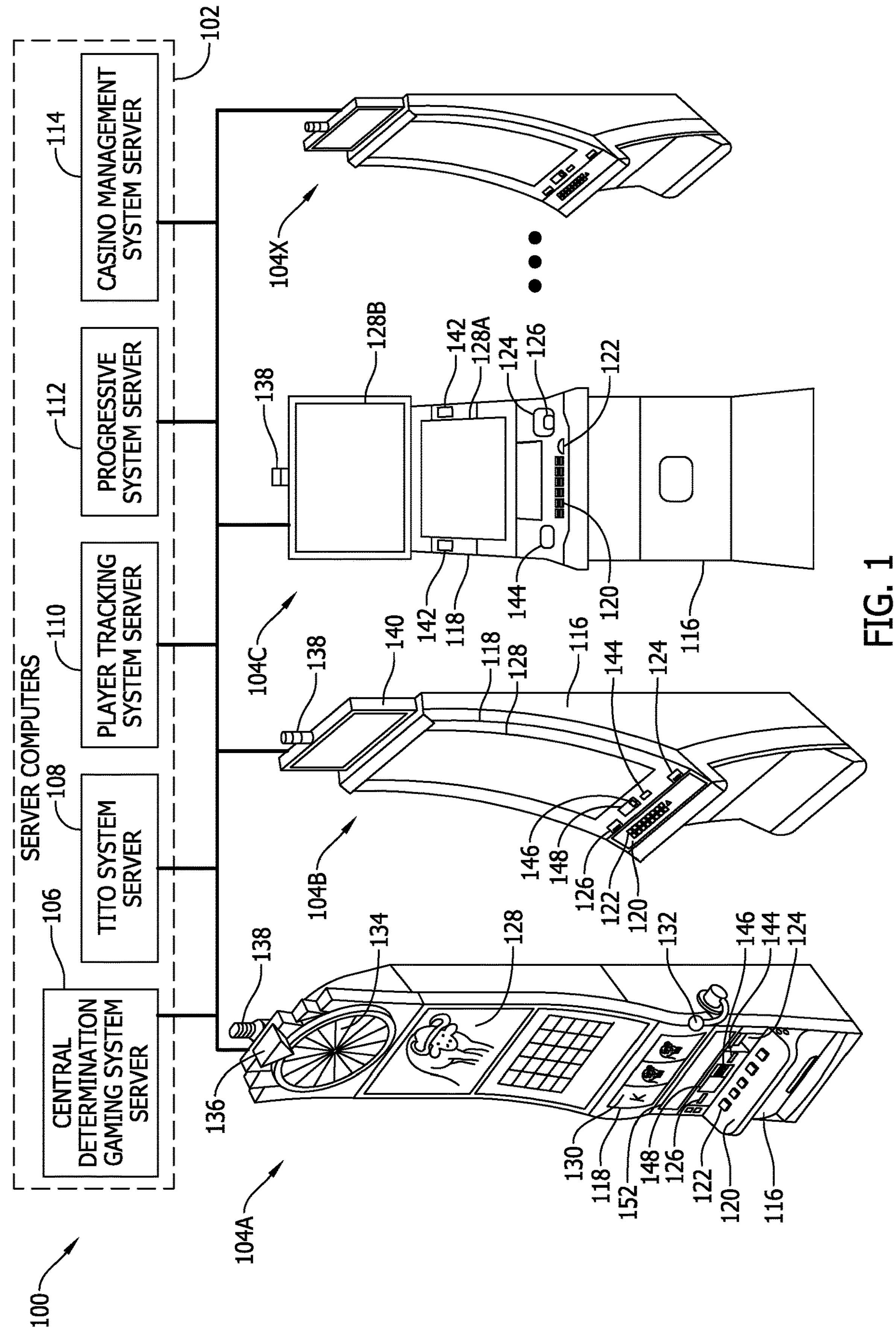
FIG. 1 is a diagram of exemplary EGMs networked with various gaming-related servers.

Many known progressive controllers are not capable of two-way communications between the progressive controller and one or more EGMs, nor are they typically capable of communicating information from the one or more EGMs to one or more overhead signs. Rather, jackpot values are commonly stored solely by the progressive controller and provided, when necessary, to the EGMs and/or overhead sign for display. This configuration may perform adequately for many types of linked progressive jackpots. Specifically, the configuration is adequate when the only piece of information to be displayed on the overhead sign is a jackpot value.

However, in some cases, an EGM and/or progressive controller may modify or enhance a particular jackpot value, such as, for example, by adding a multiplier to a jackpot awarded to a player. Traditional gaming systems are not capable of displaying this additional data on the overhead sign. In addition, many conventional EGMs are not capable of calculating a multiplied progressive jackpot without triggering a meter protection fault. Specifically, a meter protection fault may occur in the instance that an EGM calculates a multiplied progressive jackpot value that exceeds a meter protection limit established for the purpose of identifying potentially fraudulent or otherwise suspicious jackpot activity.

A gaming system is therefore described, in which different jackpot information may be displayed by a progressive system server on an overhead sign. For example, the progressive system server, which may also be referred to as a progressive controller, may display a multiplied progressive jackpot on one or more overhead signs. The progressive system server may also select a jackpot celebration scene based upon a variety of criteria, including a multiplier used to calculate the multiplied jackpot, for display with the multiplied jackpot on the overhead signs. In addition, the progressive system server may perform the multiplication (as opposed to a gaming machine) to avoid a condition in which a gaming machine providing the multiplied jackpot determines that the jackpot exceeds a highest possible jackpot.

As used herein, a "progressive jackpot" and/or a "linked progressive jackpot" is an award that receives contributions from a plurality of electronic gaming machines. For example, a plurality of electronic gaming machines may contribute a specified amount to a linked progressive jackpot each time any of the electronic gaming machines are played (e.g., with each wager placed on any of the electronic gaming machines). Over time, the linked progressive jackpot to which each electronic gaming machine contributes may increase or grow, and an indication of the jackpot may be provided to players to increase excitement as well as to encourage additional play. At a certain point, the linked progressive jackpot may be awarded (all or in part) to a player of one of the electronic gaming machines, such as in response to a triggering event occurring on the player's electronic gaming machine.

FIG. 1 is a diagram of exemplary EGMs networked with various gaming-related servers in a gaming system 100. Gaming system 100 operates in a gaming environment, including one or more servers, or server computers, such as slot servers of a casino, that are in communication, via a communications network, with one or more EGMs, or gaming devices 104A-104X, such as EGMs, slot machines, video poker machines, or bingo machines, for example. Gaming devices 104A-104X may, in the alternative, be portable and/or remote gaming devices such as, for example, and without limitation, a smart phone, a tablet, a laptop, or a game console.

Communication between gaming devices 104A-104X and servers 102, and among gaming devices 104A-104X, may be direct or indirect, such as over the Internet through a web site maintained by a computer on a remote server or over an online data network including commercial online service providers, Internet service providers, private networks, and the like. In other embodiments, gaming devices 104A-104X communicate with one another and/or servers 102 over wired or wireless RF or satellite connections and the like.

In certain embodiments, servers 102 may not be necessary and/or preferred. For example, the present invention may, in one or more embodiments, be practiced on a stand-alone gaming device such as gaming device 104A and/or gaming device 104A in communication with only one or more other gaming devices 104B-104X (i.e., without servers 102).

Servers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, a game outcome may be generated on a central determination gaming system server 106 and then transmitted over the network to any of a group of remote terminals or remote gaming devices 104A-104X that utilize the game outcome and display the result to the player.

Gaming device 104A is often of a cabinet construction that may be aligned in rows or banks of similar devices for placement and operation on a casino floor. The gaming device 104A often includes a main door 116 that provides access to the interior of the cabinet. Gaming device 104A typically includes a button area or button deck 120 accessible by a player that is configured with input switches or buttons 122, a bill validator 124, and/or ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 including a plurality of mechanical reels 130, typically 3 or 5 mechanical reels, with various symbols displayed there on. Reels 130 are then independently spun and stopped to show a set of symbols within the gaming display area 118 that may be used to determine an outcome to the game.

In many configurations, gaming machine 104A may have a main display 128 (e.g., video display monitor) mounted to, or above, gaming display area 118. Main display 128 may be, for example, a high-resolution LCD, plasma, LED, or OLED panel that may be flat or curved as shown, a cathode ray tube, or other conventional electronically controlled video monitor.

In certain embodiments, bill validator 124 may also function as a "ticket-in" reader that enables the player to use a casino-issued credit ticket to load credits onto gaming device 104A (e.g., in a cashless TITO system). In such cashless embodiments, gaming device 104A may also include a "ticket-out" printer 126 for outputting a credit ticket when a "cash out" button is pressed. Cashless ticket systems are well known in the art and are used to generate and track unique bar-codes printed on tickets to allow players to avoid the use of bills and coins by loading credits using a ticket reader and cashing out credits using ticket-out printer 126 on gaming device 104A.

In certain embodiments, a player tracking card reader 144, a transceiver for wireless communication with a player's smartphone, a keypad 146, and/or an illuminated display 148 for reading, receiving, entering, and/or displaying player tracking information can be provided. In such embodiments, a game controller within gaming device 104A communicates with player tracking server system 110 to send and receive player tracking information.

Gaming device 104A may also include, in certain embodiments, a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but could also be incorporated into play of the base game, or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

In certain embodiments, there may also be one or more information panels 152 that may be, for example, a back-lit silkscreened glass panel with lettering to indicate general game information including, for example, a game denomination (e.g., $0.25 or $1), pay lines, pay tables, and/or various game related graphics. In some embodiments, information panels 152 may be implemented as an additional video display.

Gaming device 104A traditionally includes a handle 132 typically mounted to the side of main cabinet 116 that may be used to initiate game play.

Figure 2:
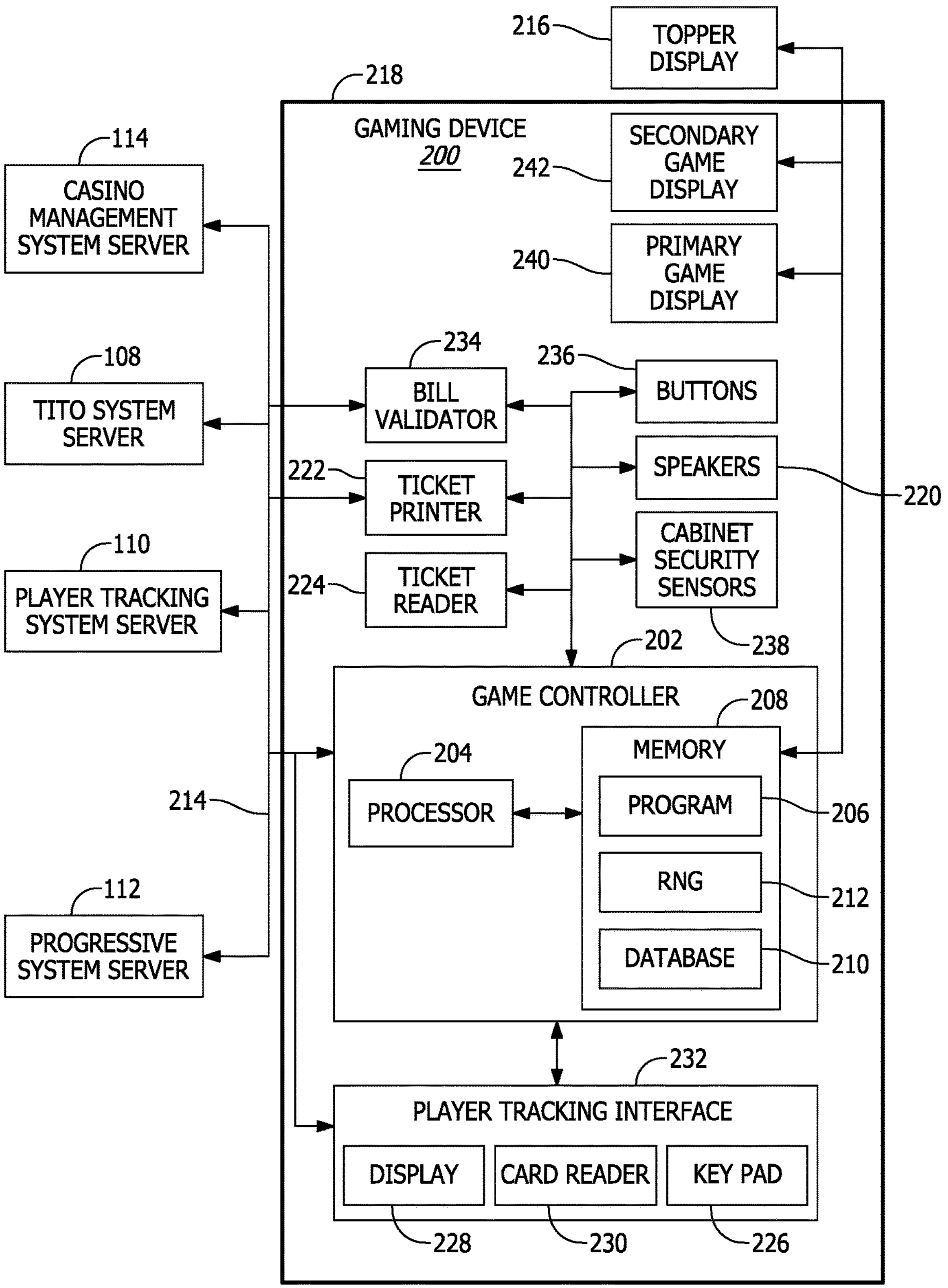
FIG. 2 is a block diagram of an exemplary gaming device.

Many or all of the above described components may be controlled by circuitry (e.g., a gaming controller) housed inside main cabinet 116 of gaming device 104A, the details of which are shown in FIG. 2.

Not all gaming devices suitable for implementing embodiments of the gaming systems, gaming devices, or methods described herein necessarily include top wheels, top boxes, information panels, cashless ticket systems, and/or player tracking systems. Further, some suitable gaming devices have only a single game display that includes only a mechanical set of reels and/or a video display, while others are designed, for example, for bar tables or table tops and have displays that face upwards.

Exemplary gaming device 104B shown in FIG. 1 is an Arc™ model gaming device manufactured by Aristocrat® Technologies, Inc. Where possible, reference numeral identifying similar features of gaming device 104A are also identified in gaming device 104B using the same reference numerals. Gaming device 104B, however, does not include physical reels 130 and instead shows game play and related game play functions on main display 128. An optional topper screen 140 may be included as a secondary game display for bonus play, to show game features or attraction activities while the game is not in play, or any other information or media desired by the game designer or operator. In some embodiments, topper screen 140 may also or alternatively be used to display progressive jackpot prizes available to a player during play of gaming device 104B.

Gaming device 104B includes main cabinet 116 having main door 118 that opens to provide access to the interior of gaming device 104B. Main door 118, or service door, is typically used by service personnel to refill ticket-out printer 126 and collect bills and tickets inserted into bill validator

124. Main door 118 may further be accessed to reset the machine, verify and/or upgrade the software, and for general maintenance operations.

Exemplary gaming device 104C shown in FIG. 1 is a Helix™ model gaming device manufactured by Aristocrat® Technologies, Inc. Gaming device 104C includes a main display 128A that is in a landscape orientation. Although not illustrated by the front view illustrated in FIG. 1, landscape display 128A has a curvature from top to bottom. In certain embodiments, display 128A is a flat panel display. Main display 128A is typically used for primary game play while a secondary display 128B is used for bonus game play, to show game features or attraction activities while the game is not in play, or any other information or media desired by the game designer or operator.

Many different types of games, including mechanical slot games, video slot games, video poker, video black jack, video pachinko, keno, bingo, and lottery, may be provided with or implemented within gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of pay lines, maximum jackpot, progressive or non-progressive, bonus games, Class II, or Class III, etc.

FIG. 2 is a block diagram of an exemplary gaming device 200, or EGM, connected to various external systems, including TITO system server 108, player tracking system server 110, progressive system server 112, and casino management system server 114. All or parts of gaming device 200 may be embodied in game devices 104A-104X shown in FIG. 1. The games conducted on gaming device 200 are controlled by a game controller 202 that includes one or more processors 204 and a memory 208 coupled thereto. Games are represented by game software or a game program 206 stored on memory 208. Memory 208 includes one or more mass storage devices or media housed within gaming device 200. One or more databases 210 may be included in one or more databases 210 for use by game program 206. A random number generator (RNG) 212 is implemented in hardware and/or software and is used, in certain embodiments, to generate random numbers for use in operation of gaming device 200 to conduct game play and to ensure the game play outcomes are random and meet regulations for a game of chance.

Alternatively, a game instance, or round of play of the game, may be generated on a remote gaming device such as central determination gaming system server 106, shown in FIG. 1. The game instance is communicated to gaming device 200 via a network 214 and is then displayed on gaming device 200. Gaming device 200 executes game software to enable the game to be displayed on gaming device 200. In certain embodiments, game controller 202 executes video streaming software that enables the game to be displayed on gaming device 200. Game software may be loaded from memory 208, including, for example, a read only memory (ROM), or from central determination gaming system server 106 into memory 208. Memory 208 includes at least one section of ROM, random access memory (RAM), or other form of storage media that stores instructions for execution by processor 204.

Gaming device 200 includes a topper display 216. In an alternative embodiment, gaming device 200 includes another form of a top box such as, for example, a topper wheel, or other topper display that sits on top of main cabinet 218. Main cabinet 218 or topper display 216 may also house various other components that may be used to add features to a game being played on gaming device 200, including speakers 220, a ticket printer 222 that prints bar-coded tickets, a ticket reader 224 that reads bar-coded tickets, and a player tracking interface 232*a*. Player tracking interface 232*a* may include a keypad 226 for entering player tracking information, a player tracking display 228 for displaying player tracking information (e.g., an illuminated or video display), a card reader 230 for receiving data and/or communicating information to and from media or a device such as a smart phone enabling player tracking. Ticket printer 222 may be used to print tickets for TITO system server 108. Gaming device 200 may further include a bill validator 234, buttons 236 for player input, cabinet security sensors 238 to detect unauthorized opening of main cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g., amount wagered and time of play) for individual players so that an operator may reward players in a loyalty program. The player may use player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by casino management system server 114.

Gaming devices, such as gaming devices 104A-104X and 200, are highly regulated to ensure fairness and, in many cases, gaming devices 104A-104X and 200 are operable to award monetary awards (e.g., typically dispensed in the form of a redeemable voucher). Therefore, to satisfy security and regulatory requirements in a gaming environment, hardware and software architectures are implemented in gaming devices 104A-104X and 200 that differ significantly from those of general-purpose computers. Adapting general purpose computers to function as gaming devices 200 is not simple or straightforward because (1) regulatory requirements for gaming devices, (2) harsh environments in which gaming devices operate, (3) security requirements, and (4) fault tolerance requirements. These differences require substantial engineering effort and often additional hardware.

When a player wishes to play gaming device 200, he/she can insert cash or a ticket voucher through a coin acceptor (not shown) or bill validator 234 to establish a credit balance on the gaming machine. The credit balance is used by the player to place wagers on instances of the game and to receive credit awards based on the outcome of winning instances of the game. The credit balance is decreased by the amount of each wager and increased upon a win. The player can add additional credits to the balance at any time. The player may also optionally insert a loyalty club card into card reader 230. During the game, the player views the game outcome on game displays 240 and 242. Other game and prize information may also be displayed.

For each game instance, a player may make selections that may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using player-input buttons 236, primary game display 240, which may include a touch screen, or using another suitable device that enables a player to input information into gaming device 200.

During certain game events, gaming device 200 may display visual and auditory effects that can be perceived by the player. These effects add to the excitement of a game, which makes a player more likely to continue playing. Auditory effects include various sounds that are projected by speakers 220. Visual effects include flashing lights, strobing lights, or other patterns displayed from lights on gaming device 200 or from lights behind information panel 152, shown in FIG. 1.

When the player wishes to stop playing, he/she cashes out the credit balance (typically by pressing a cash out button to receive a ticket from ticket printer 222). The ticket may be "cashed-in" for money or inserted into another machine to establish a credit balance for play.

Figure 3A:
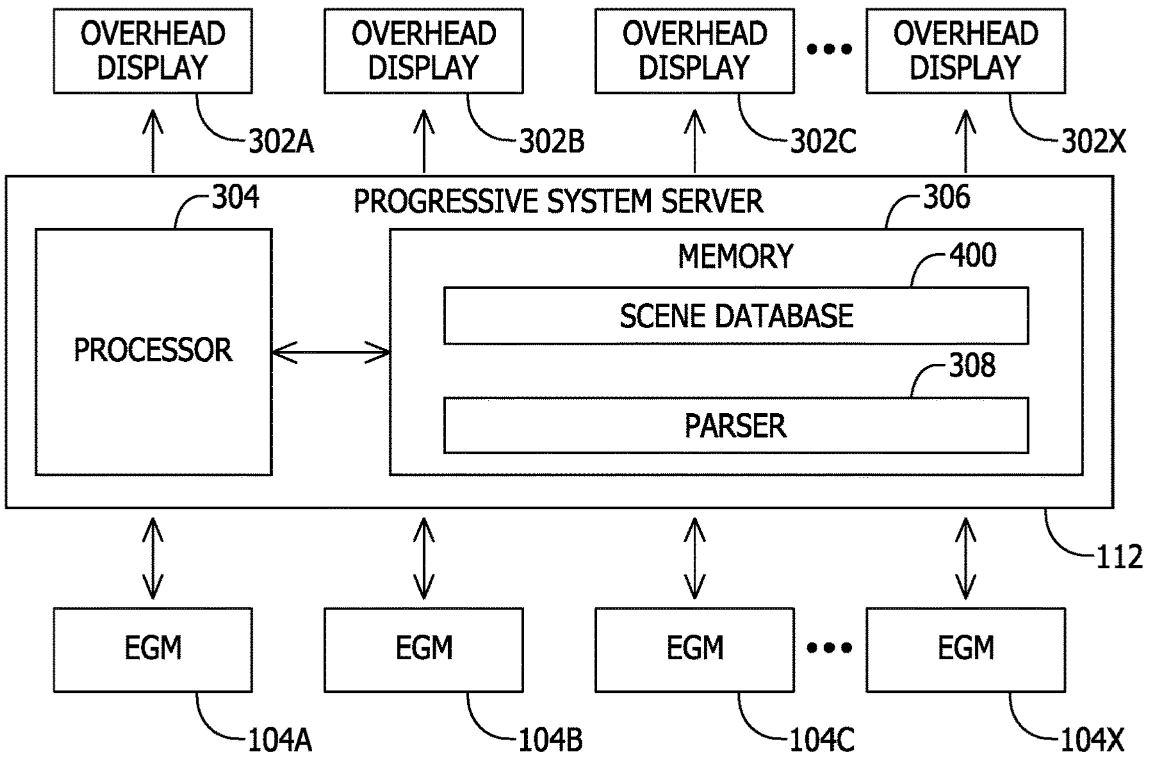
FIG. 3A is a schematic diagram of the EGMs networked through the progressive system server shown at FIG. 1 with a plurality of overhead displays.

FIG. 3A is a schematic diagram of EGMs 104A-104X networked through progressive system server 112 with a plurality of overhead displays 302A, 302B, 302C, and 302X. In the exemplary embodiment, progressive system server 112 may be communicatively coupled between EGMs 104A-104X and overhead displays 302A-302X. As a result, and as described herein, EGMs 104A-104X may be capable of communicating, via progressive system server 112, with overhead displays 302A-302X.

In the exemplary embodiment, overhead displays 302A-302X may be mounted over or above one or more EGMs, such as over or above EGMs 104A-104X. For example, EGMs 104A-104X may be arranged or grouped physically together to form a "bank" of EGMs, all of which may contribute to a linked progressive jackpot, as described above. One or more overhead displays 302A-302X may be placed overhead, such as above eye level, where the overhead displays 302A-302X are visible above the bank of EGMs 104A-104X. However, in other embodiments, overhead displays 302A-302X may be located anywhere, including at eye level and/or below eye level as well at any location within a casino. In addition, as described herein, each overhead display may display information associated with one or more linked progressive jackpots, such as one or more linked progressive jackpots associated with the bank of EGMs 104A-104X. To this end, overhead displays 302A-302X may include any suitable display, such as, for example, any computer monitor, any television screen or television monitor, any digital signage, and the like.

Progressive system server 112 is a computer, such as a server computer or a system of server computers, configured to control and/or monitor a linked progressive jackpot, as described above. In some embodiments, progressive system server 112 may be referred to as a "progressive controller." For instance, progressive system server 112 may be Aristocrat's VERTEX progressive controller. In at least some embodiments, progressive system server 112 may be a standalone hardware component, such as a rack-mounted server component and/or a self-contained standalone computing device, and may include, for example, a computer processor 304 and a tangible, non-transitory, computer-readable memory 306.

In the exemplary embodiment, memory 306 may store one or more computer-readable instructions, that when executed by processor 304, cause processor 304 to perform operations as described herein, such as calculating a multiplied progressive jackpot value and/or communicating with EGMs 104A-104X and/or overhead displays 302A-302X. For example, in some embodiments, memory 306 may store one or more software modules, such as, a scene database 400, which may be a software plugin, as described herein, and/or a parser module 308, which may also be a plugin.

Progressive system server 112 may also, in at least some embodiments, include a housing that encloses memory 306 and processor 304, which may be mounted on a printed circuit board (PCB), a printed wiring board (PWB), and the like. Moreover, in some embodiments, the housing enclosing processor 304 and memory 306 may include a door (e.g., an access door), which may provide access to components within progressive system server 112. Further still, in at least some embodiments, progressive system server 112 may include a variety of other hardware, such as, for example, and without limitation, heating and/or cooling systems, battery backup, one or more power supplies, one or more power converters, and the like.

In some embodiments, progressive system server 112 may include a plurality of power supplies and/or one or more voltage dividers configured to separate a primary power supply voltage into a plurality of secondary power supply voltages. Each secondary power supply voltage may be independently provided to an area of progressive system server 112, such as, for example, depending upon a voltage and/or current required by the components receiving power. In some embodiments, voltage and/or current supplied within progressive system server 112 may be tightly regulated to ensure that progressive system server 112 functions properly as well as to detect operational issues, such as tampering and/or power supply failures that might otherwise negatively impact the security and/or performance of progressive system server 112. In some embodiments, progressive system server 112 may include power supply monitoring circuitry configured to monitor one or more power supply voltages. For instance, progressive system server 112 may include overvoltage and/or under-voltage monitoring circuitry as well as overcurrent and/or undercurrent monitoring circuitry.

In at least some embodiments, progressive system server 112 may also include one or more security monitoring circuits, such as, for example, circuits and/or hardware configured to detect unauthorized entry of progressive system server 112. For example, progressive system server 112 may include one or more switches, such as one or more micro-switches coupled to and/or configured to monitor one or more access doors. Unauthorized entry of progressive system server 112 may trigger (e.g., open or close) one or more of these switches, which may send a signal, such as an alarm signal, to processor 304 within progressive system server 112 and/or an external system processor indicating that unauthorized entry has occurred.

In some embodiments, a battery backup may be coupled to the security monitoring circuits, which may permit continued and/or uninterrupted security monitoring operations, such as, for example, even where a main power supply to progressive system server 112 is cut-off or interrupted. When power is restored, progressive system server 112 may determine whether a security violation, such as unauthorized entry, has occurred, such as, for example, via a software query to one or more status registers. Additional event log entries and/or other data authentication operations may also be performed.

Moreover, in at least some embodiments, progressive system server 112 may include one or more trusted memory devices, such as, for example, one or more trusted tangible, non-transitory, computer-readable memory devices, which may include, but are not limited to, memory 306. These devices may include volatile as well as non-volatile memories. In addition, trusted memory devices may include secure confirmation codes (e.g., encrypted security codes) and/or other data that may be used to verify the authenticity of one or more mass storage memory devices, such as one or more hard-drives, communicatively coupled to or included within progressive system server 112.

In various embodiments, progressive system server 112 may include, or communicate with, one or more mass storage devices to retrieve game code stored on the one or more mass storage devices. The game code may be executed, such as by one or more processors, including, but not limited to, processor 304, housed within progressive system server 112, to perform operations associated with a wagering game provided by and/or otherwise facilitated by progressive system server 112. For example, a mass storage device may include game code, embodied as computer-readable instructions executable by one or more processors, such as processor 304, for implementing a wagering game.

For example, in at least some embodiments, progressive system server 112 may include one or more plugins. As used herein, a plugin may include any of a variety of software components, each of which may be added to memory 306 of progressive system server 112 to enable one or more additional features. For example, a game plugin may be added to progressive system server 112 to permit the operation, or hosting, by progressive system server 112, of a variety of different games. More particularly, a first game plugin may be added to and hosted by progressive system server 112 to permit play of a first game associated with the first game plugin by EGMs 104A-104X. Likewise, a second game plugin (and a third, fourth, etc.) may be added to and hosted by progressive system server 112 to permit play of a second (and third, fourth, etc.) game by EGMs 104A-104X. In other words, a plurality of game plugins may be added to progressive system server 112 to permit a variety of games to be played by EGMs 104A-104X connecting to and communicating with progressive system server 112.

To prevent tampering with the game code, progressive system server 112 may include a variety of safeguards. For example, progressive system server 112 may prevent modification of the game code stored on one or more mass storage devices except under certain secure conditions, such as, for example, when one or more physical switches and/or hardware elements, such as one or more locking mechanisms, are enabled. In addition, progressive system server 112 may include software and/or hardware that prevents modification of game code except under authorized or secure conditions. For example, in some embodiments, progressive system server 112 may include hardware level mass storage protection capable of operation at a circuit level to monitor and identify unauthorized attempts to access, modify, read, and/or write data to a mass storage device coupled to or included within progressive system server 112. Unauthorized attempts may generate, for example, one or more messages (e.g., hardware signals, hardware error triggers, registry updates, software messages, etc.) that indicate the presence of unauthorized data access and/or an attempt to access data without authorization.

In the exemplary embodiment, progressive system server 112 may receive jackpot contributions from EGMs 104A-104X, such as each time a wager is placed on any of EGMs 104A-104X. In addition, progressive system server 112 may maintain a record of one or more linked progressive jackpots, such as a total monetary and/or credit award associated with each jackpot. In response to receiving one or more jackpot contributions, progressive system server 112 may increment one or more of the linked progressive jackpots by a predefined amount, such as by an amount of each jackpot contribution received from EGMs 104A-104X. Thus, progressive system server 112 may be communicatively coupled to EGMs 104A-104X and may maintain a record of one or more linked progressive jackpots associated with EGMs 104A-104X. In addition, in at least some embodiments, progressive system server 112 may include software, such as a media player or scene database plugin, configured to display one or more scenes, as described herein, on overhead displays 302A-302X.

Figure 3B:
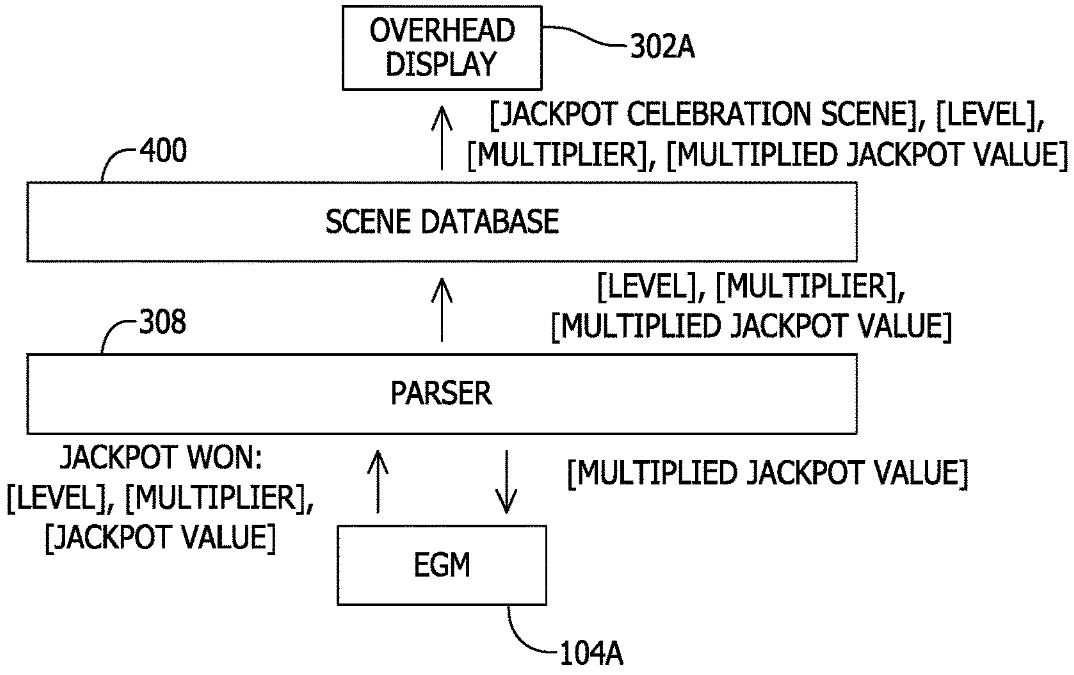
FIG. 3B is a schematic diagram illustrating exemplary data communications between an EGM and an overhead display, as shown at FIG. 3A.

FIG. 3B is a schematic diagram illustrating exemplary data communications between an EGM 302A-302X, such as EGM 302A, and an overhead display 104A-104X, such as overhead display 104A. Accordingly, in the exemplary embodiment, parser module 308 may listen for a trigger event from an EGM 104A-104X, such as a "Jackpot Won" event, which may indicate that a jackpot has been awarded by an EGM 104A-104X.

Parser module 308 may receive, in conjunction with the indication that a jackpot has been awarded, any of a gaming machine identifier (e.g., a MAC address or IP address), a jackpot level, a progressive jackpot value, and/or a jackpot multiplier from the EGM 104A-104X providing the jackpot award. As described below, a progressive jackpot level may be any identifier, such as any tier or degree, associated with a progressive jackpot value from the progressive jackpot value provided by the EGM 104A-104X with the "Jackpot Won" trigger.

In response to receiving "Jackpot Won" trigger and/or the jackpot level, progressive jackpot value, and/or jackpot multiplier, parser module 308 (and/or another software module stored in memory 306) may calculate a multiplied progressive jackpot value, such as, for example, by multiplying the received progressive jackpot value by the received multiplier. As described herein, this calculation may be performed by progressive system server 112 rather than an EGM 104A-104X to prevent the occurrence of a meter protection fault on the EGM 104A-104X. However, in some embodiments, an EGM 104A-104X may perform the calculation as well. In addition, in some embodiments, and as described in additional detail below, an EGM 104A-104X may not store the jackpot value; rather, progressive system server 112 may store the jackpot value, which it may retrieve based, for example, upon a jackpot level received from an EGM 104A-104X when a progressive jackpot is awarded.

Accordingly, under normal circumstances, an EGM 104A-104X may store a meter protection fault limit in the form of a dollar amount. If a progressive jackpot awarded by the EGM 104A-104X exceeds the dollar amount associated with the meter protection fault limit, the EGM 104A-104X may trigger a meter protection fault, which may be used to indicate that the EGM 104A-104X has awarded a potentially fraudulent jackpot in excess of the limit. In other words, a jackpot in excess of the meter protection fault limit may suggest tampering or fraudulent activity. This problem may be exacerbated in some cases, such as, for example, when an EGM 104A-104X calculates a multiplied progressive jackpot award.

As an example, a meter protection fault limit for an EGM 104A-104X may be set at $10,000. During operation, an EGM 104A-104X may award a progressive jackpot, such as a jackpot in the amount of $5,000. This jackpot value is less than the meter protection fault limit and may not trigger a meter protection fault. However, if the EGM 104A-104X also awards a jackpot multiplier, such as a multiplier of ×3 (or times 3), as described below, the multiplied progressive jackpot value may increase to a value of $15,000, which is in excess of the meter protection fault limit of $10,000. Accordingly, to prevent the occurrence of a meter protection fault when a multiplied progressive jackpot is awarded, in at least some embodiments, an EGM 104A-104X may not calculate the multiplied progressive jackpot value. Rather, progressive system server 112 may perform the calculation, and the multiplied progressive jackpot value may be passed or transmitted back to the EGM 104A-104X triggering the initial jackpot award. Thus, progressive system server 112 may calculate a multiplied progressive jackpot, in at least some embodiments, to prevent a meter protection fault on a gaming machine 104A-104X awarding the progressive jackpot.

In the exemplary embodiment, parser module 308 may provide the jackpot level, progressive jackpot value, multiplied progressive jackpot value, and/or jackpot multiplier to scene database 400. As described below, scene database 400 may perform operations to select a jackpot celebration scene based upon at least one of the received variables. Scene database 400 may, in addition, provide the selected jackpot celebration scene to one or more overhead displays 302A-302X, such as, for example, overhead display 302A. Scene database 400 may also transmit the jackpot level, progressive jackpot value, multiplied progressive jackpot value, and/or jackpot multiplier to one or more overhead displays 302A-302X.

Figure 4:
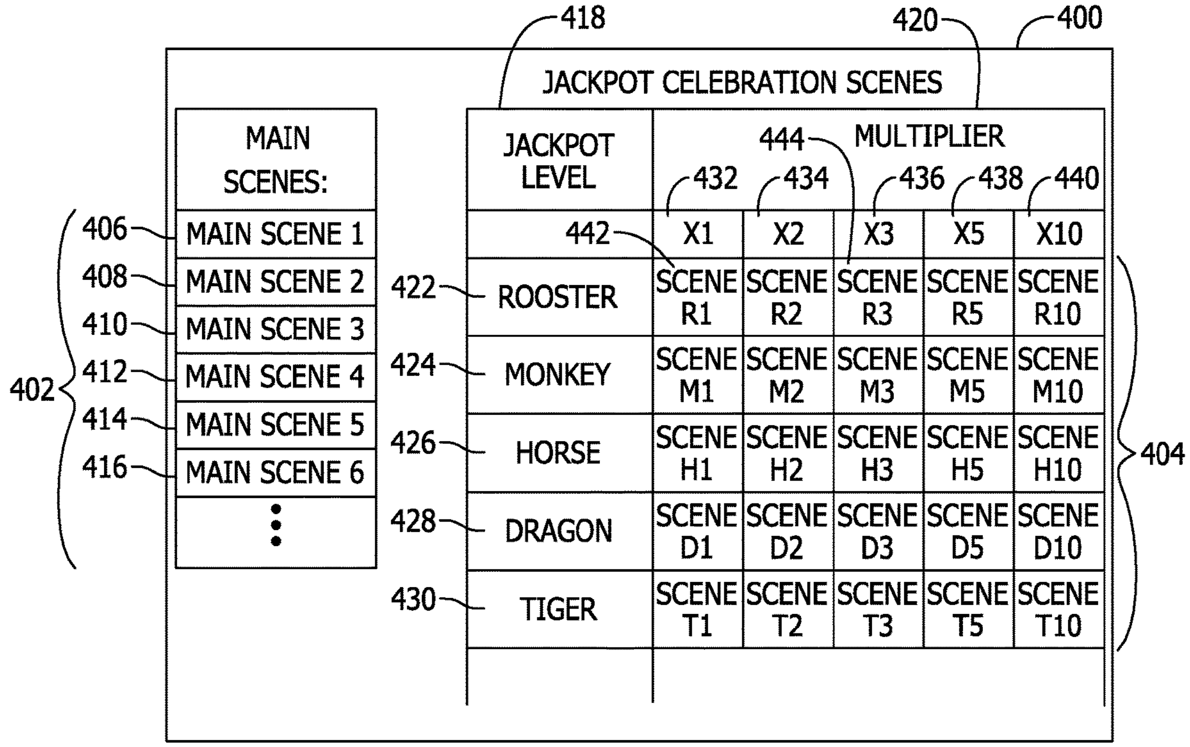
FIG. 4 is a block diagram of an exemplary database structure containing a plurality of scenes selectable for display on one or more of the plurality of overhead displays shown at FIG. 3A.

FIG. 4 is a block diagram of an exemplary database structure 400 (referred to herein as a "database" or "scene database"), which may be stored on progressive system server 112. In the exemplary embodiment, scene database 400 may include a plugin, as described above, and may contain a plurality of scenes selectable for display on one or more of overhead displays 302A-302X (shown at FIG. 3). Accordingly, in at least some embodiments, database 400 may include a plurality of main scenes 402 and a plurality of jackpot celebration scenes 404. In other embodiments, database 400 may only include main scenes 402 or celebration scenes 404. Main scenes 402 may include any number of scenes, such as, for example, a first main scene 406, a second main scene 408, a third main scene 410, a fourth main scene 412, a fifth main scene 414, and a sixth main scene 416. Main scenes 402 may, in addition, include any suitable still image, any animated image, and the like displayable by overhead displays 302A-302X.

Figure 5A:
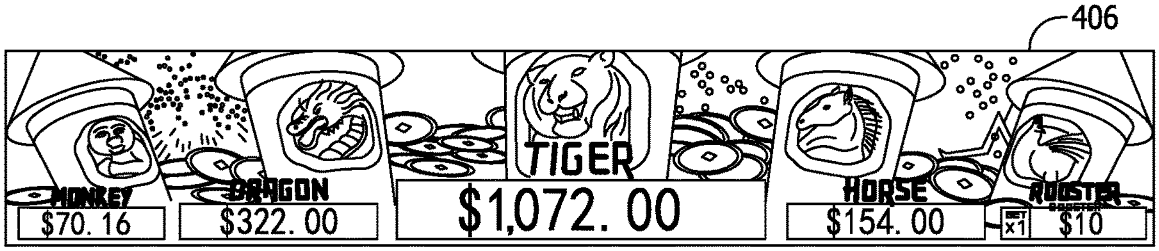
FIG. 5A is a schematic view of a first main scene selectable from the database structure shown at FIG. 4.
Figure 5B:
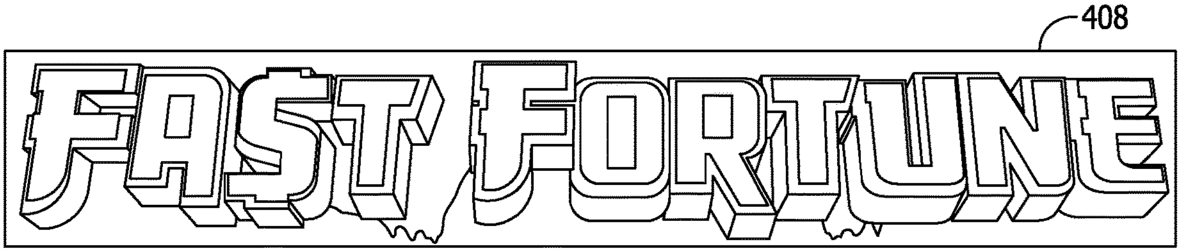
FIG. 5B is a schematic view of a second main scene selectable from the database structure shown at FIG. 4.
Figure 5C:
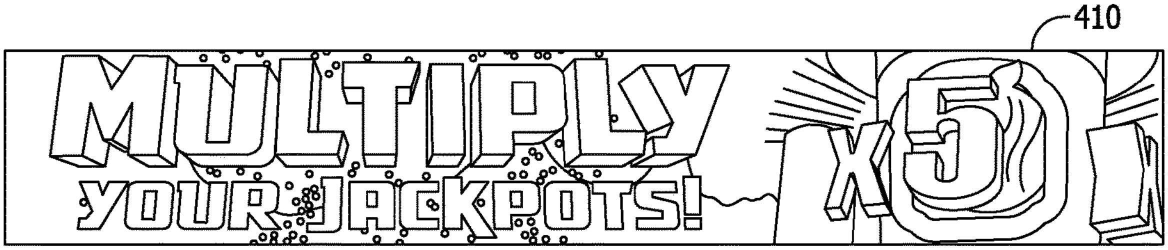
FIG. 5C is a schematic view of a third main scene selectable from the database structure shown at FIG. 4.
Figure 5D:
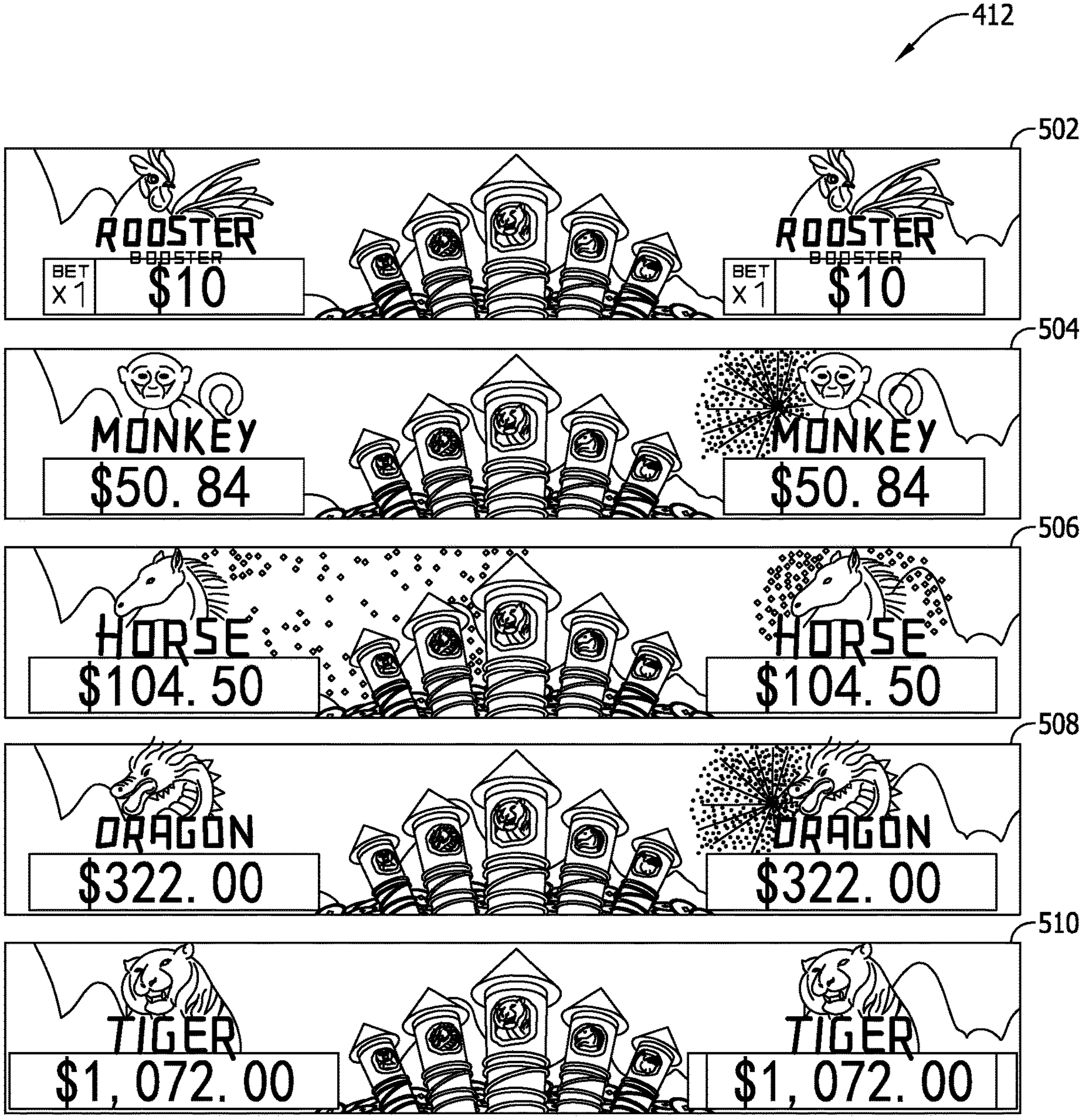
FIG. 5D is a schematic view of a fourth main scene, including a plurality of sub-scenes, selectable from the database structure shown at FIG. 4.
Figure 5E:
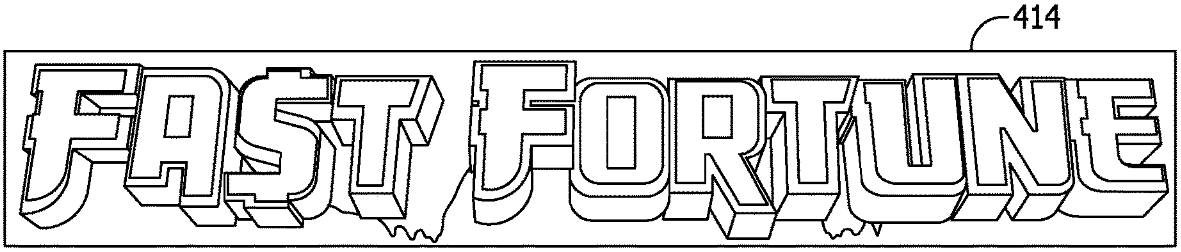
FIG. 5E is a schematic view of a fifth main scene selectable from the database structure shown at FIG. 4.
Figure 5F:
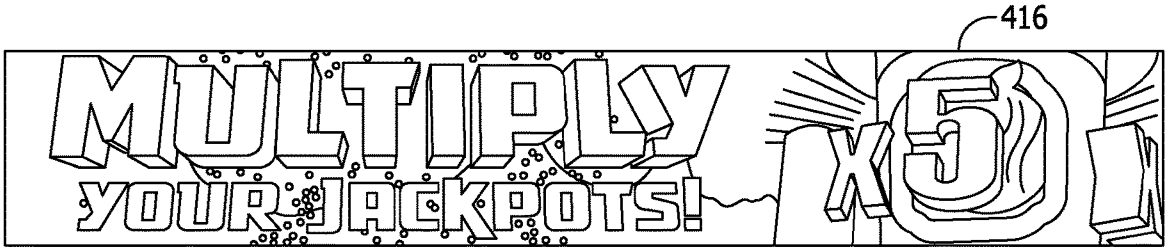
FIG. 5F is a schematic view of a sixth main scene selectable from the database structure shown at FIG. 4.

An exemplary plurality of main scenes 402 are shown with reference to FIGS. 5A-5F. Specifically, FIG. 5A is a schematic view of first main scene 406 selectable from database 400. Likewise, FIG. 5B is a schematic view of second main scene 408 selectable from database 400, FIG. 5C is a schematic view of third main scene 410 selectable from database 400, FIG. 5D is a schematic view of fourth main scene 412 selectable from database 400, FIG. 5E is a schematic view of fifth main scene 414 selectable from database 400, and FIG. 5F is a schematic view of sixth main scene 416 selectable from database 400.

In various embodiments, any of main scenes 402 may include one or more sub-scenes, which may be alternatingly and/or repeatingly displayed for a portion or interval of a time period allotted to the associated main scene 402. For example, as shown with respect to FIG. 5D, a plurality of sub-scenes depicting a plurality of progressive jackpot awards may be included in a main scene 402. In the example shown, fourth main scene 412 includes a first sub-scene 502 depicting a first progressive jackpot (e.g., a "Rooster" jackpot level having a value of $10), a second sub-scene 504 depicting a second progressive jackpot (e.g., a "Monkey" jackpot level having a value of $50.84), a third sub-scene 506 depicting a third progressive jackpot (e.g., a "Horse" jackpot level having a value of $104.50), a fourth sub-scene 508 depicting a fourth progressive jackpot (e.g., a "Dragon" jackpot level having a value of $322.00), and a fifth sub-scene 510 depicting a fifth progressive jackpot (e.g., a "Tiger" jackpot level having a value of $1,072.00). Although specific jackpot values are shown with respect to each sub-scene 502-510, it will be appreciated that these jackpot values are dynamic and vary as each jackpot value is incremented and/or decremented over time.

In the exemplary embodiment, each sub-scene 502-510 may be displayed for a predefined period of time (e.g., several seconds to several minutes), such that passersby may quickly review the contents displayed on overhead displays 302A-302X to determine the awards associated with a plurality of progressive jackpots (e.g., a "Rooster" jackpot, a "Monkey" jackpot, a "Horse" jackpot, a "Dragon" jackpot, and a "Tiger" jackpot). Although five sub-scenes 502-510 are illustrated, it will be appreciated that any number of sub-scenes may be displayed, such as, for example, a number corresponding to a number of progressive jackpots available. Specifically, although in the illustrated example, there are five progressive jackpots, if greater or fewer jackpots are available, the number of sub-scenes may be adjusted as well.

With returning reference now to FIG. 4, in addition to main scenes 402, database 400 may also include a plurality of jackpot celebration scenes 404. Specifically, in the example shown, there are twenty-five jackpot celebration scenes 404 stored in database 400. However, as described herein, any suitable number of jackpot celebration scenes 404 may be stored in database 400.

In addition, in the exemplary embodiment, each jackpot celebration scene 404 may correspond to a progressive jackpot level 418 and a progressive jackpot multiplier 420. In the exemplary embodiment, a progressive jackpot level 418 may be any identifier, such as any tier or degree, associated with a progressive jackpot. For example, as described herein, a progressive jackpot level 418 may be associated with an animal level or an animal tier, such as a "Rooster" level, a "Monkey" level, a "Horse" level, a "Dragon" level and/or a "Tiger" level. However, in other embodiments, a progressive jackpot level may be associated with any other suitable tier or level, such as, for example, any pictographic level, any numerical level, and the like. Moreover, a plurality of progressive jackpots, each associated with a particular progressive jackpot level 418, may increase from lowest to highest through the range of progressive jackpot levels 418. For example, a "tier 1" progressive jackpot level (e.g., a "Rooster" level) may be associated with a smallest or least progressive jackpot, while a "tier 5" progressive jackpot level (e.g., a "Tiger" level) may be associated with a largest or greatest progressive jackpot.

In the illustrated example, there are five progressive jackpot levels 418. However, those of skill will appreciate that any suitable number of progressive jackpot levels 418 may be implemented. Accordingly, and in the exemplary embodiment, there is a first progressive jackpot level 422 (e.g., a "Rooster" jackpot level), a second progressive jackpot level 424 (e.g., a "Monkey" jackpot level), a third progressive jackpot level 426 (e.g., a "Horse" jackpot level), a fourth progressive jackpot level 428 (e.g., a "Dragon" jackpot level), and a fifth progressive jackpot level 430 (e.g., a "Tiger" jackpot level). Again, however, any number of jackpot levels 418 may be used, and the animal levels are merely illustrative.

In addition, in the example shown, there are five progressive jackpot multipliers 420. It will be appreciated, however, that any number of jackpot multipliers may be implemented, and that the five progressive jackpot multipliers 420 described herein are merely illustrative of one embodiment. Accordingly, in at least one embodiment, there is a first progressive jackpot multiplier 432, a second progressive jackpot multiplier 434, a third progressive jackpot multiplier 436, a fourth progressive jackpot multiplier 438, and a fifth progressive jackpot multiplier 440. In the illustrated example, first progressive jackpot multiplier 432 corresponds to a first multiplication factor of one ("×1" or unity), second progressive jackpot multiplier 434 corresponds to a second multiplication factor of two ("×2" or "times 2"), third progressive jackpot multiplier 436 corresponds to a third multiplication factor of three ("×3" or "times 3"), fourth progressive jackpot multiplier 438 corresponds to a fourth multiplication factor of five ("×5" or "times 5"), and fifth progressive jackpot multiplier 440 corresponds to a fifth multiplication factor of ten ("×10" or "times 10").

Accordingly, each jackpot celebration scene 404 may correspond to a particular jackpot level 418 and a particular jackpot multiplier 420. For example, each of the illustrative twenty-five jackpot celebration scenes may correspond to one of jackpot levels 422-430 (e.g., one of the "Rooster," "Monkey," "Horse," "Dragon," and "Tiger" levels) and one of the jackpot multipliers 432-440 (e.g., one of the ×1, ×2, ×3, ×5, and ×10 multipliers). For instance, a first jackpot celebration scene 442 may correspond to first progressive jackpot level 422 ("Rooster") and a first jackpot multiplier 432 ("×1). Similarly, a second jackpot celebration scene 444 may correspond to first jackpot progressive level 422 ("Rooster") and third progressive jackpot multiplier 436 ("×3"). The remaining jackpot celebration scenes may likewise correspond to one of jackpot levels 422-430 and one of jackpot multipliers 432-440, such that, in at least one embodiment, there is a one-to-one relationship between each jackpot celebration scene (however many jackpot celebration scenes are used) and a level/multiplier combination.

Figure 6A:
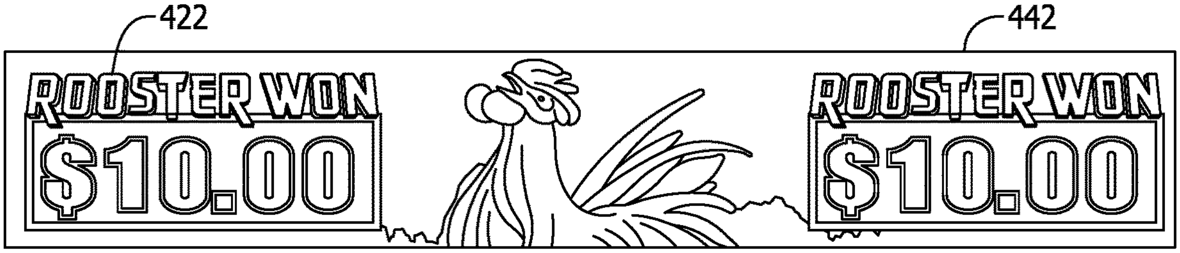
FIG. 6A is a schematic view of a first jackpot celebration scene selectable from the database structure.
Figure 6B:
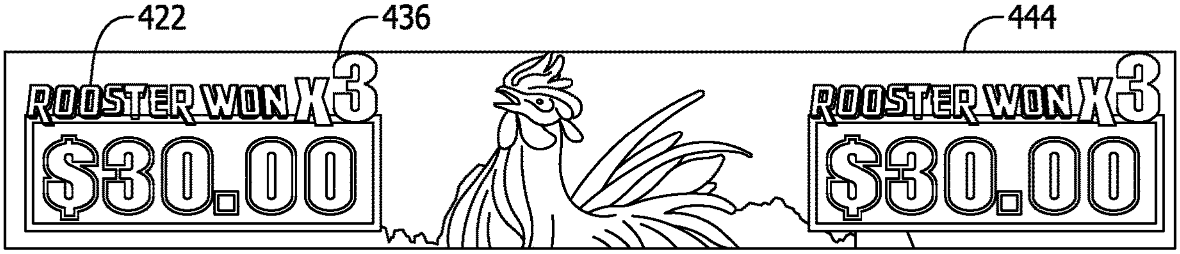
FIG. 6B is a schematic view of a second jackpot celebration scene selectable from the database structure.

An exemplary first jackpot celebration scene 442 is shown with respect to FIG. 6A. As shown, first jackpot celebration scene 442 includes the first or "Rooster" jackpot level 422 and no multiplier is shown (e.g., because the multiplier is simply unity). However, in some embodiments, a unity multiplier (e.g., "×1") may be shown. An exemplary second jackpot celebration scene 444 is shown with respect to FIG. 6B. As illustrated, second jackpot celebration scene 444 includes the first or "Rooster" jackpot level 422 and third progressive jackpot multiplier 436 (e.g., "×3"), indicating that the value of the progressive jackpot at the "Rooster" level 422 has been multiplied by a multiplication factor of three. The value of the progressive jackpot in second jackpot celebration scene 444 is thus $30.00, corresponding to a three-fold increase of the base value at the "Rooster" level 422 of $10.00. It will be appreciated, however, that first jackpot celebration scene 442 and second jackpot celebration scene 444 are merely illustrative and that any suitable scene displaying a corresponding level, a corresponding multiplier, a corresponding (non-multiplied or starting) progressive jackpot value, and/or a corresponding multiplied progressive jackpot value may be shown.

Figure 7:
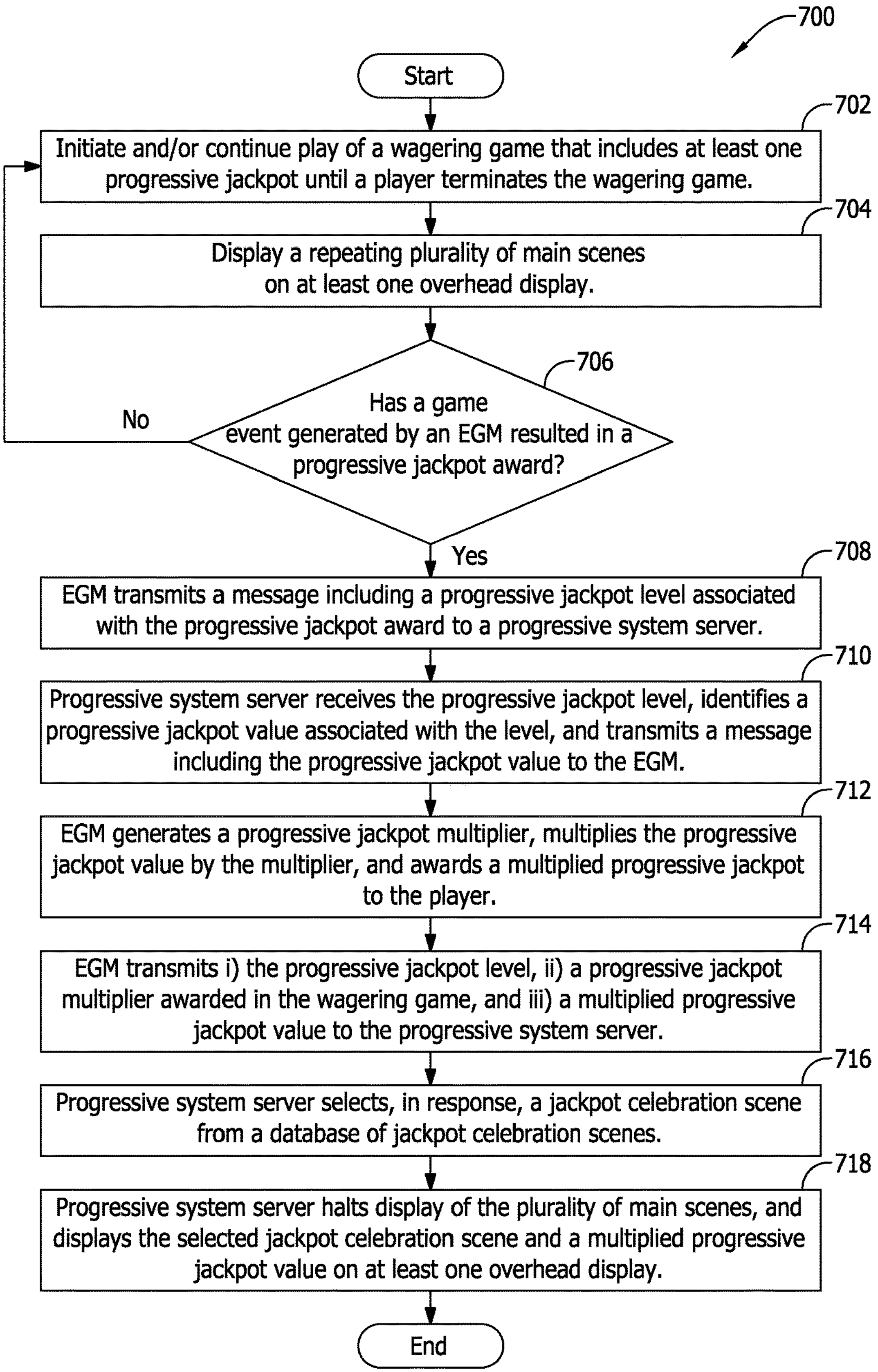
FIG. 7 is a flowchart illustrating a process for displaying information associated with one or more multiplied linked progressive jackpots on one or more of the plurality of overhead displays shown at FIG. 3A.

FIG. 7 is a flowchart illustrating an exemplary process 700 for displaying information associated with one or more multiplied progressive jackpots on one or more of overhead displays 302A-302X (shown at FIGS. 3A and 3B). As described herein, many conventional overhead displays are not capable of communicating with an EGM 104A-104X, directly or indirectly, and cannot display (or obtain) information generated by the EGM 104A-104X.

Accordingly, in the exemplary embodiment, a player may initiate a wagering game on any of EGMs 104A-104X (step 702). The wagering game may include any suitable wagering game (e.g., a wagering game including any suitable game theme, any suitable game rules, and the like). In addition, as described herein, the wagering game may be linked to at least one progressive jackpot. Specifically, each of EGMs 104A-104X may contribute a predefined amount to one or more linked progressive jackpots each time a player of any of EGMs 104A-104X places a wager in a wagering game executed and displayed by EGMs 104A-104X. In the exemplary embodiment, and as described above, there are five linked progressive jackpots, each associated with a progressive jackpot level. Specifically, there is a first progressive jackpot level 422 (e.g., a "Rooster" jackpot level), a second progressive jackpot level 424 (e.g., a "Monkey" jackpot level), a third progressive jackpot level 426 (e.g., a "Horse" jackpot level), a fourth progressive jackpot level 428 (e.g., a "Dragon" jackpot level), and a fifth progressive jackpot level 430 (e.g., a "Tiger" jackpot level). However, it will be appreciated that any suitable number of progressive jackpot levels 418 may be used as well as that any suitable level designation, such as an animal, pictographic, or numeric designation, may be used.

In the exemplary embodiment, during play of the wagering game, progressive system server 112 may select and display one or more main scenes 402 from database 400 (step 704). More particularly, progressive system server 112 may, in the exemplary embodiment, select one of first main scene 406, second main scene 408, third main scene 410, fourth main scene 412, fifth main scene 414, and/or sixth main scene 416 from database 400. In some embodiments, each main scene 402 may be displayed for a period of time, such as, for example, a period of time ranging from several seconds to several minutes. In addition, progressive system server 112 may display each of main scenes 402 sequentially or in order, such as, for example, sequentially as follows: first main scene 406, second main scene 408, third main scene 410, fourth main scene 412, fifth main scene 414, and sixth main scene 416. At the completion of such a sequence, progressive system server 112 may restart the sequence, beginning with first main scene 406 and ending with sixth main scene 416, such that main scenes 402 are displayed sequentially and repeatingly until, as described herein, an EGM 104A-104X triggers one of the five linked progressive jackpots.

In addition, as game play progresses, one of EGMs 104A-104X may generate a game event, such as a "Jackpot Won" trigger event, that results in a jackpot award on the EGM 104A-104X (step 706). For example, a player may achieve a symbol combination in the wagering game that triggers, or is associated with, one of the five linked progressive jackpots. In response, the EGM 104A-104X generating the "Jackpot Won" trigger event may transmit a message that includes the jackpot level associated with the triggered progressive jackpot to progressive system server 112 (step 708). For example, if a "Rooster" level 422 jackpot is triggered, the EGM 104A-104X may transmit the "Rooster" level 422 to progressive system server 112. Likewise, if a "Monkey" level 424 jackpot is triggered, the EGM 104A-104X may transmit the "Monkey" level 424 to progressive system server 112. In addition, if a "Horse" level 426 jackpot is triggered, the EGM 104A-104X may transmit the "Horse" level 426 to progressive system server 112. Similarly, if a "Dragon" level 428 jackpot is triggered, the EGM 104A-104X may transmit the "Dragon" level 428 to progressive system server 112, and if a "Tiger" level 430 jackpot is triggered, the EGM 104A-104X may transmit the "Tiger" level 430 to progressive system server 112. In other embodiments, as described above, any other progressive jackpot level 418, such as another pictographic and/or a numerical level, may be transmitted to progressive system server 112.

In the exemplary embodiment, and in response to receiving the progressive jackpot level 422-430 from the EGM 104A-104X triggering the jackpot award, progressive system server 112 may identify a progressive jackpot value associated with the received progressive jackpot level 422-430 and may, in response, transmit a message that includes the progressive jackpot value associated with the received level 422-430 to the EGM 104A-104X (step 710). For example, if a "Rooster" level 422 is received, progressive system server 112 identifies the "Rooster" level jackpot value (e.g., $10) and provides this value to the EGM 104A-104X. Similarly, if a "Monkey" level 424 is received, progressive system server 112 identifies the "Monkey" level jackpot value (e.g., $50.84) and provides this value to the EGM 104A-104X. In addition, if a "Horse" level 426 is received, progressive system server 112 identifies the "Horse" level jackpot value (e.g., $104.50) and provides this value to the EGM 104A-104X. Moreover, if a "Dragon" level 428 is received, progressive system server 112 identifies the "Dragon" level jackpot value (e.g., $322.00) and provides this value to the EGM 104A-104X. In addition, if a "Tiger" level 430 is received, progressive system server 112 identifies the "Tiger" level jackpot value (e.g., $1,072.00) and provides this value to the EGM 104A-104X.

In some embodiments, progressive jackpot values may be stored by EGMs 104A-104X. In such a case, progressive system server 112 may not perform the step of looking a progressive jackpot value up based upon a received progressive jackpot level; rather, the received progressive jackpot level may be accompanied, in the data transmission/message received from an EGM 104A-104X, by the progressive jackpot value and/or the progressive jackpot multiplier. Thus, in some embodiments, progressive system server 112 receives a progressive jackpot level in response to a "Jackpot Won" trigger event and provides a progressive jackpot value to an EGM 104A-104X, while in other embodiments, an EGM 104A-104X stores a record of a progressive jackpot value.

In some embodiments, and in response to receiving a progressive jackpot value from progressive system server 112 and/or in response determining a progressive jackpot value stored on a memory of an EGM 104A-104X, the EGM 104A-104X may determine a multiplied progressive jackpot value (step 712). More particularly, when a progressive jackpot value is received, an EGM 104A-104X may calculate a multiplied progressive jackpot value by multiplying the received progressive jackpot value by a multiplier (or multiplication factor).

However, as described herein, in at least some embodiments, an EGM 104A-104X may not calculate a multiplied progressive jackpot value. Rather, the calculation may be performed on progressive system server 112 to prevent the occurrence of a meter protection fault on an EGM 104A-104X.

In various embodiments, a progressive jackpot multiplier may be generated or selected by an EGM 104A-104X based upon a game event occurring on the EGM 104A-104X, such as, for example, the game event that triggered the jackpot award in the first place and/or another game event. This may be the case even where, for example, progressive system server 112 performs the multiplied progressive jackpot calculation. The EGM 104A-104X may also award or provide the multiplied progressive jackpot value to the player (wherever it is calculated), such as, for example, by adding a monetary value and/or a credit value associated with the multiplied progressive jackpot value to the player's player account. Further, progressive system server 112 may reduce a progressive jackpot won by the player by the multiplied progressive jackpot value.

In the exemplary embodiment, the EGM 104A-104X may also transmit the progressive jackpot level 422-430 to progressive system server 112 accompanied by the progressive jackpot value, multiplier, and/or the multiplied progressive jackpot value (step 714). However, in some embodiments, only the multiplier, progressive jackpot value, and/or progressive jackpot level may be provided to progressive system server 112, whereupon progressive system server 112 may calculate the multiplied progressive jackpot value from the progressive jackpot value and the received multiplier.

In response, progressive system server 112 may select a jackpot celebration scene 404 from database 400 (step 716). Specifically, as described above, progressive system server 112 may select an appropriate jackpot celebration scene 404 based upon the jackpot multiplier 432-440 and the progressive jackpot level 422-430 provided to progressive system server 112. As described above, there are, in the exemplary embodiment, twenty-five jackpot celebration scenes, each corresponding to a specific combination of jackpot level 422-430 and jackpot multiplier 432-440. For example, a first jackpot celebration scene 442 corresponds to first progressive jackpot level 422 ("Rooster") and a first jackpot multiplier 432 ("×1). Similarly, a second jackpot celebration scene 444 corresponds to first jackpot progressive level 422 ("Rooster") and third progressive jackpot multiplier 436 ("×3"). It will be appreciated, however, that any suitable number of jackpot levels 418, jackpot multipliers 420, and/or jackpot celebration scenes may be used.

Thus, progressive system server 112 may select an appropriate jackpot celebration scene from the plurality of available jackpot celebration scenes stored in database 400. In addition, progressive system server 112 may display the selected jackpot celebration scene and/or the multiplied progressive jackpot value on one or more of overhead displays 302A-302X (step 718). To display a selected jackpot celebration scene, progressive system server 112 may temporarily halt display of main scenes 402 (shown at FIGS. 5A-5F). As described above, several exemplary jackpot celebration scenes are shown with respect to FIGS. 6A and 6B. In addition, in some embodiments, progressive system server 112 may also display any combination of the initial progressive jackpot value, the progressive jackpot level, the multiplier, the multiplied progressive jackpot value, and/or any jackpot celebration scene selected from database 400.

In addition to the features and advantages described above, in at least some embodiments, progressive system server 112 may evaluate the values of each of the linked progressive jackpots for the purpose of applying an additional animation to one or more main scenes 404. For example, if a value of any jackpot exceeds a predefined threshold value, progressive system server 112 may apply an animation to one or more main scenes to indicate that the progressive jackpot value has exceeded the predefined threshold. In the exemplary embodiment, if a value of a jackpot exceeds a first threshold value, a stack of coins (or "coin stack") may be displayed in conjunction with the jackpot on one or more of overhead displays 302A-302X. In addition, if the value of a jackpot exceeds a second threshold value, the coin stack may be added and/or another animation, such as a pulsing or flashing animation, may be displayed in conjunction with the jackpot. For instance, these animations may be added to any of the sub-scenes 502-510 shown with respect to FIG. 5D.

Figure 8:
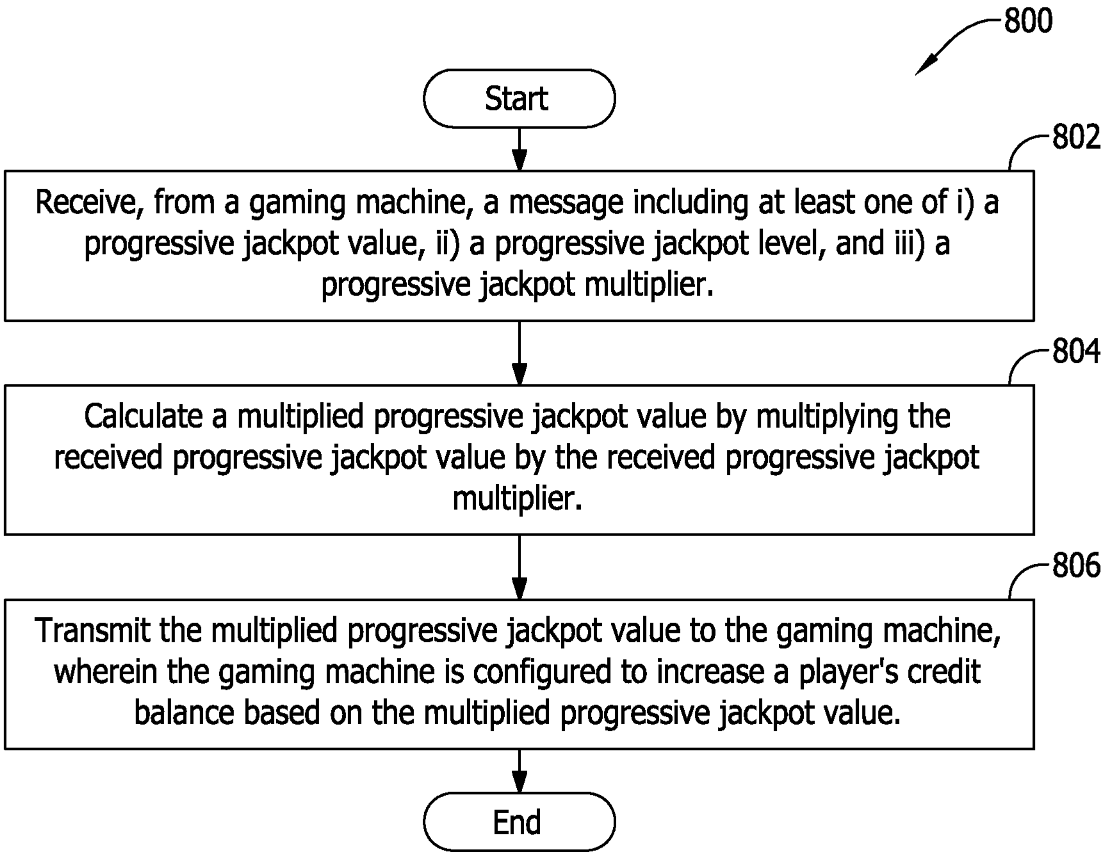
FIG. 8 is a flowchart illustrating an exemplary process for calculating a multiplied progressive jackpot on a progressive system server, as shown at FIGS. 3A and 3B.

FIG. 8 is a flowchart illustrating an exemplary process 800 for calculating a multiplied progressive jackpot on progressive system server 112 (as shown with reference to FIGS. 3A and 3B). In the exemplary embodiment, progressive system server 112 may receive, as described above, a "Jackpot Won" trigger event from an EGM 104A-104X. Specifically, parser 308 may receive the "Jackpot Won" trigger event, which it may, in at least some embodiments, listen for and/or detect. The "Jackpot Won" trigger event may be accompanied by a message including at least one of a progressive jackpot value, a progressive jackpot level, and/or a progressive jackpot multiplier (step 802). Parser 308 may, in addition, and in response to detecting the "Jackpot Won" trigger event, parse this message to extract the progressive jackpot value, progressive jackpot level, and/or progressive jackpot multiplier.

Progressive system server 112 may, in addition, calculate a multiplied progressive jackpot value by multiplying the received progressive jackpot value by the received progressive jackpot multiplier (step 804). For example, parser 308 may, in some embodiments, be configured to perform the multiplication function. However, in other embodiments, any other software module included in progressive system server 112 may perform the multiplication.

Parser 308 may, in addition, transmit any of the progressive jackpot value, progressive jackpot level, and/or progressive jackpot multiplier to database 400, which may include a software module and/or plugin as described herein. In response to receiving any of progressive jackpot value, progressive jackpot level, and/or progressive jackpot multiplier, database 400 may, as described in detail above, select one or more main scenes and/or jackpot celebration scenes, which may be provided to and displayed on one or more overhead displays 302A-302X. The progressive jackpot value, multiplied progressive jackpot value, progressive jackpot level, and/or progressive jackpot multiplier may, in addition, be provided from database 400 to one or more overhead displays 302A-302X, such as, for example, for display in association with a selected main scene and/or jackpot celebration scene.

In the exemplary embodiment, progressive system server 112 may also transmit the multiplied progressive jackpot value, which it has calculated, to the EGM 104A-104X that triggered the progressive jackpot. The EGM 104A-104X may receive and display the multiplied progressive jackpot value, and a meter protection fault may not be triggered on the EGM 104A-104X, even where the multiplied progressive jackpot value exceeds a meter protection fault limit of the EGM 104A-104X. Thus, in at least some embodiments, progressive system server 112 may calculate a multiplied progressive jackpot value on behalf of an EGM 104A-104X, so that the EGM 104A-104X is capable of triggering and awarded a multiplied progressive jackpot without triggering a meter protection fault.

A computer, controller, or server, such as those described herein, includes at least one processor or processing unit and a system memory. The computer, controller, or server typically has at least some form of computer readable non-transitory media. As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit, and other programmable circuits "configured to" carry out programmable instructions, and these terms are used interchangeably herein. In the embodiments described herein, memory may include, but is not limited to, a computer-readable medium or computer storage media, volatile and nonvolatile media, removable and non-removable media implemented in any method or technology for storage of information such as computer readable instructions, data structures, program modules, or other data. Such memory includes a random access memory (RAM), computer storage media, communication media, and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As indicated above, the process may be embodied in computer software. The computer software could be supplied in a number of ways, for example on a tangible, non-transitory, computer readable storage medium, such as on any nonvolatile memory device (e.g. an EEPROM). Further, different parts of the computer software can be executed by different devices, such as, for example, in a client-server relationship. Persons skilled in the art will appreciate that computer software provides a series of instructions executable by the processor.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. An electronic gaming device comprising:

a memory device storing a meter protection fault limit associated with a meter protection fault; and at least one processor in two-way communication with a jackpot server, wherein the at least one processor is configured to:

in response to a determination that a value is to be awarded from the electronic gaming device, compare the value to the meter protection fault limit of the electronic gaming device to determine whether the value triggers a meter protection fault;

in response to the value triggering the meter protection fault, prevent presentation of the value by the electronic gaming device;

in response to a determination that a multiplier is to be applied to the value, generate instructions including the value and the multiplier, wherein the value and the multiplier are associated with an electronic game provided by the electronic gaming device, and wherein application of the multiplier to the value at the electronic gaming device would trigger the meter protection fault stored in the memory device to indicate that the electronic gaming device has provided a potentially fraudulent output;

transmit the generated instructions to the jackpot server to prevent the meter protection fault from triggering at the electronic gaming device by causing the multiplier to be applied to the value at the jackpot server, the generated instructions causing the jackpot server to compute a multiplied value based on the value and the multiplier;

receive the multiplied value transmitted by the jackpot server, the multiplied value in excess of the meter protection fault limit; and based upon the multiplied value being received from the jackpot server and not generated by the electronic gaming device, cause the multiplied value to be presented by the electronic gaming device.

2. The electronic gaming device of claim 1, wherein the transmitted message includes instructions include a level.

3. The electronic gaming device of claim 2, wherein a celebration scene of a plurality of celebration scenes stored in a scene database is selected based upon the level, the value, and the multiplier, and wherein the celebration scene is caused to be displayed on at least one of a display device or an overhead display device associated with the electronic gaming device.

4. The electronic gaming device of claim 3, wherein the at least one processor is further configured to transmit the message instructions to the jackpot server including the level, the value, and the multiplier, and wherein the jackpot server includes a parser module for (i) calculating the multiplied value, and (ii) provide the level, the value, the multiplier, and the multiplied value to the scene database included in the jackpot server.

5. The electronic gaming device of claim 1, wherein the at least one processor is further configured to increase a balance associated with a player account in response to receiving the multiplied value.

6. The electronic gaming device of claim 1, wherein the electronic gaming device is included in a plurality of electronic gaming devices, and wherein the at least one processor is further configured to include a machine identifier in the message instructions transmitted to the jackpot server.

7. The electronic gaming device of claim 1, wherein the wherein the jackpot server is in communication with an overhead display device, and wherein the jackpot server is configured to cause the overhead display device to, in response to the multiplied value, cause the overhead display device to display a scene selected based on at least one of the value or the multiplier while the multiplied value is presented by the electronic gaming device.

8. A non-transitory computer-readable storage medium with instructions stored thereon that, in response to execution by at least one processor, cause the at least one processor to:

in response to a determination that a value is to be awarded from an electronic gaming device, compare the value to a meter protection fault limit of the electronic gaming device to determine whether the value triggers a meter protection fault;

in response to the value triggering the meter protection fault, prevent presentation of the value by the electronic gaming device;

in response to a determination that a multiplier is to be applied to the value, generate instructions including the value and the multiplier, wherein the value and the multiplier are associated with an electronic game provided by the electronic gaming device, wherein the electronic gaming device includes a memory device storing a meter protection fault limit associated with a meter protection fault, and wherein application of the multiplier to the value at the electronic gaming device would trigger the meter protection fault stored in the memory device to indicate that the electronic gaming device has provided a potentially fraudulent output;

transmit the generated instructions to a jackpot server in two-way communication with the at least one processor to prevent the meter protection fault from triggering at the electronic gaming device by causing the multiplier to be applied to the value at the jackpot server, the generated instructions causing the jackpot server to compute a multiplied value based on the value and the multiplier;

receive the multiplied value transmitted by the jackpot server, the multiplied value in excess of the meter protection fault limit; and based upon the multiplied value being received from the jackpot server and not generated by the electronic gaming device, cause the multiplied value to be presented by the electronic gaming device.

9. The non-transitory computer-readable storage medium of claim 8, wherein the transmitted message comprises instructions include a level.

10. The non-transitory computer-readable storage medium of claim 9, wherein a celebration scene of a plurality of celebration scenes stored in a scene database is identified based upon at least one of the level, the value, or the multiplier, and wherein the celebration scene is caused to be displayed on at least one of a display device or an overheard display device associated with the electronic gaming device.

11. The non-transitory computer-readable storage medium of claim 10, wherein the instructions further cause the at least one processor to transmit the message instructions to the jackpot server including the level, the value, and the multiplier, and wherein the jackpot server includes a parser module for (i) calculating the multiplied value, and (ii) provide the level, the value, the multiplier, and the multiplied value to the scene database included in the jackpot server.

12. The non-transitory computer-readable storage medium of claim 8, wherein the instructions further cause the at least one processor to increase a balance associated with a player account in response to receiving the multiplied value.

13. The non-transitory computer-readable storage medium of claim 8, wherein the electronic gaming device is included in a plurality of electronic gaming devices, and wherein the instructions further cause the at least one processor to include a machine identifier in the message instructions transmitted to the jackpot server.

14. The non-transitory computer-readable storage medium of claim 8, wherein the jackpot server in in communication with an overhead display device, and wherein the jackpot server is configured to, in response to computing the multiplied value, cause the overhead display device to display a scene selected based on at least one of the value or the multiplier while the multiplied value is presented by the electronic gaming device.

15. A method of bypassing a meter protection fault in electronic gaming and facilitating gaming, the method performed by at least one processor in two-way communication between a jackpot server and an electronic gaming device including a memory device storing a meter protection fault limit associated with the meter protection fault, the method comprising:

in response to a determination that a value is to be awarded from the electronic gaming device, comparing the value to the meter protection fault limit of the electronic gaming device to determine whether the value triggers a meter protection fault;

in response to the value triggering the meter protection fault, preventing presentation of the value by the electronic gaming device;

in response to a determination that a multiplier is to be applied to the value, generating instructions including the value and the multiplier, wherein the value and the multiplier are associated with an output of an electronic game for a player account, and wherein application of the multiplier to the value at the electronic gaming device would trigger the meter protection fault stored in the memory device to indicate that the electronic gaming device has provided a potentially fraudulent output;

transmitting the generated instructions to the jackpot server to prevent the meter protection fault from triggering at the electronic gaming device by causing the multiplier to be applied to the value at the jackpot server, the generated instructions causing the jackpot server to compute a multiplied value based on the value and the multiplier;

receiving the multiplied value transmitted by the jackpot server, the multiplied value in excess of the meter protection fault limit; and based upon the multiplied value being received from the jackpot server and not generated by the electronic gaming device, causing the multiplied value to be presented by the electronic gaming device.

16. The method of claim 15, wherein the message includes instructions include a level, and wherein the method further comprises selecting a celebration scene of a plurality of celebrations scenes based upon at least one of the level, the value, or the multiplier.

17. The method of claim 16, further comprising causing display of the celebration scene on at least one of a display device of the electronic gaming device or an overhead display device of the electronic gaming device.

18. The method of claim 17, further comprising, based upon receiving the multiplied value, causing display of the multiplied value on the display device and the overhead display device.

19. The method of claim 15, wherein the electronic game is played at a remote gaming device associated with the player account.

20. The method of claim 16, further comprising:

receiving the transmitted message instructions at a parser module of the jackpot server, the parser module calculating the multiplied value; and providing, via the parser module of the jackpot server, the level, the value, the multiplier, and the multiplied value to a scene database included in the jackpot server, the scene database including the plurality of celebration scenes.

* * * * *